July 19, 1955 W. J. DAUGHERTY 2,713,373
IMPLEMENT TIRE
Filed April 18, 1952
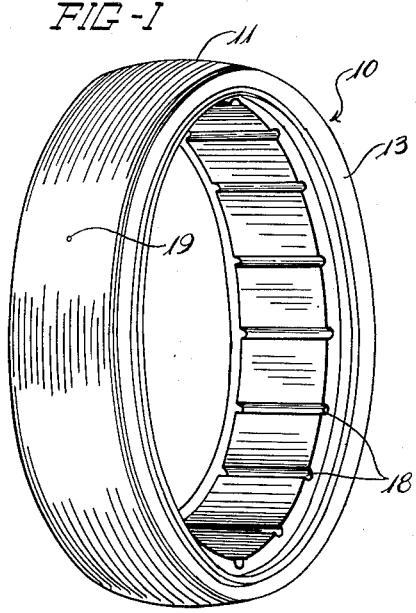
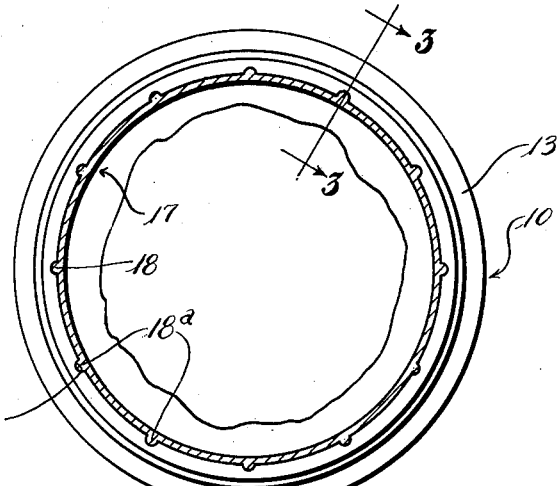
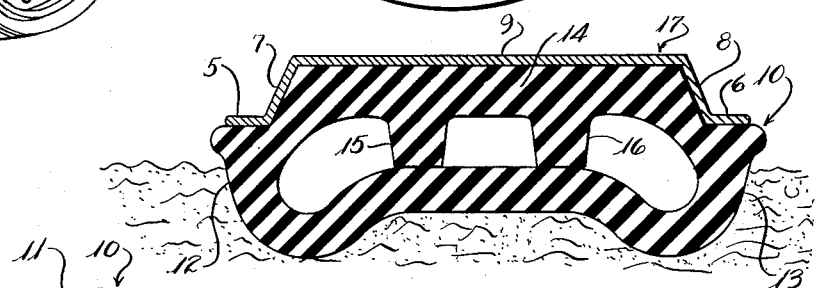
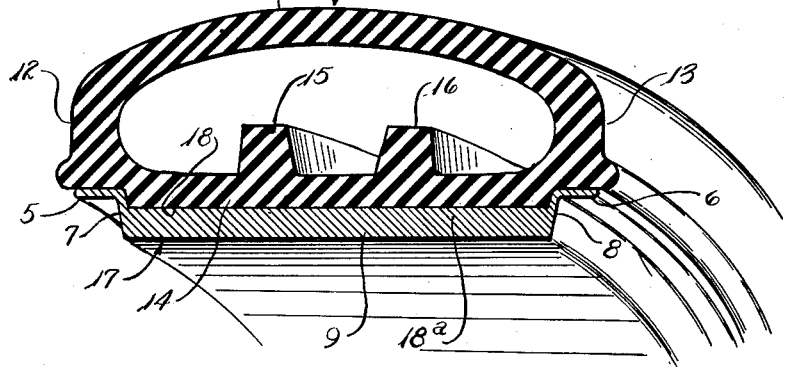
INVENTOR.
WALTER J. DAUGHERTY
BY Ely, Frye & Hamilton
ATTYS.

United States Patent Office 2,713,373
Patented July 19, 1955

2,713,373

IMPLEMENT TIRE

Walter J. Daugherty, Cuyahoga Falls, Ohio, assignor to The Firestone Tire & Rubber Company, Akron, Ohio, a corporation of Ohio Application April 18, 1952, Serial No. 283,105

1 Claim. (Cl. 152—384)

This invention relates to a semi-pneumatic tire adapted for use on the gauge wheels of farm implements. As is well known, such wheels are used to control the depth of cultivator blades and must be provided with sufficient flotation so that the depth will be substantially uniform in varying conditions of soil.

Heretofore, semi-pneumatic tires have been used on the gauge wheels of farm cultivators of a similar type to that of applicant's described hereinafter. However, such prior art tires have not been entirely satisfactory in that they were subjected to harmful localized flexing and damaging distortion of their side portions adjacent their rims when the tire supported their normal load. Such injury to the tire was particularly in evidence when said prior art tires supported a static load. Such flexing and distortion often resulted in the premature failure of the tire.

It is an object of the present invention to provide a demountable tire for the gauge wheel of a farm implement, such as a cultivator, which will be self-cleaning and will have auxiliary load-carrying means within the tire, whereby the degree of flexure of the tire under load is limited due to said auxiliary means carrying a portion of the load at a predetermined limit of depression of the crown of the tire.

Another object of the present invention is to provide one or more radially outwardly projecting, circumferentially extending load-carrying ribs formed on the base of a semi-pneumatic gauge tire, said ribs being normally spaced from the crown of the tire but resiliently supporting same at the ground contact area of the tire when said tire is in service.

Referring to the drawings:

Fig. 1 is a perspective view of a tire which embodies the present invention;

Fig. 2 is a side elevation of the tire of Fig. 1 shown mounted on a rim, with the rim being shown in section;

Fig. 3 is a somewhat enlarged fragmentary perspective view, partly in section, of the tire shown in Fig. 2, the section being taken on line 3—3 of Fig. 2; and Fig. 4 is a sectional view of the tire of Fig. 1 drawn to a larger scale and shown on a rim illustrating the crown portion of the tire being supported at its ground contact area by auxiliary load-carrying elements of the tire, as occurs when the tire is run in service.

By reference to Fig. 3, it will be seen that a tire referred to generally as 10 comprises a crown portion 11, side portions 12 and 13, base portion 14, and circumferentially extending radially outward raised auxiliary ribs 15 and 16. The tire is adapted to be mounted on a rim, referred to generally as 17, having a base portion 9 and radially outward extending flanges 7 and 8, which latter flanges terminate in substantially horizontally extending shoulders 5 and 6, respectively. Tire 10 is provided with the usual small breather hole 19 extending through the wall of the tire.

Referring now to Fig. 1, it will be noted that a plurality of transversely extending grooves 18 are formed in the base 14 of tire 10, and by reference to Figs. 2 and 3, it will be seen that transversely extending ribs 18a are formed on the base of rim 17, which ribs are adapted to fit into grooves 18 thereby providing means for preventing the tire from slipping relative to the rim circumferentially thereof when the tire is run in service on said rim. The inside diameter of the tire relative to the outside diameter of the rim base is such as to cause the tire to fit snugly upon the rim. The rim may be combined with any type of gauge wheel found satisfactory.

In operation, the crown portion of tire 10 will be pressed radially inwardly by its contact with the ground until the inside surface of the wall of said crown contacts the top of the ribs 15 and 16 as illustrated in Fig. 4. It is to be noted that these ribs extend radially outwardly a short distance beyond the shoulders 5 and 6 of the rim. The distance ribs 15 and 16 extend from the base of the said tire is such that the sides 12 and 13 of the tire will carry a substantial portion of the load to which the tire is subjected, and ribs 15 and 16 will carry the remaining portion of the load. The flexing of the crown of the tire as it comes under load and is relieved of load results in the tire cleaning itself of dirt or other foreign material sticking to the crown surface.

Said ribs are so disposed and radially extended that they support the crown of the tire at the ground contact area in a plane approximately parallel with the axis of the tire. This prevents a channel forming at the ground contact surface of the tire as is the case in prior art tires and as would be the case with applicant's tire if ribs 15 and 16 were not present. Such channel in the tire ground contact surface impacts the soil against the crown of the tire with concentrated force making it more difficult for the tire to self-clean itself of such soil.

While the invention is not to be limited to any particular type of rubber compound, or relative dimensions of the various elements of the tire, applicant has determined that for a four inch size tire that an all rubber body of tire tread stock type rubber compound having a crown, sidewalls and base approximately ⅜" thick is satisfactory. It has also been determined that ribs 15 and 16 are satisfactory when they are ⅜" wide and high and the base of these ribs are in approximately the same plane as the shoulders 6 and 5 of rim 14. It has been found that for satisfactory self-cleaning and prevention of injury to the sides of the tire of the kind that results from too much flexing and distortion, that said ribs should be of such volume and height as to support the crown of the tire at a distance not greater than 15% to 30% of the sectional height of the tire radially outwardly of the base of the tire. Less than 15% does not avoid premature failure of the tire and more than 30% does not permit sufficient movement of the crown of the tire for satisfactory self-cleaning.

Preferably, the tire is manufactured by extruding its section, cutting to length, butt splicing ends, laying in mold, placing mold in vulcanizing press, closing press, injecting hollow needle-like inflating tube through crown of tire, inflating tire with any suitable inflation medium during vulcanization, all of which will be understood by those familiar with the art. It is to be understood, however, that the invention is not to be limited to all-rubber, semi-pneumatic or zero pressure tire as it is useful in tires for the same purpose and of similar sectional contour, although the tire may be inflatable and have strain resistant members such as one or more plies of cord tire fabric embodied in the tire.

What is claimed is:

In combination a tire and a farm implement wheel, said tire comprising an endless, hollow, body portion composed of rubber-like material and being adapted to operate in service with atmospheric pressure, said tire having a crown, sidewalls and a base, said sidewalls being adapted to carry a substantial portion of a load on said tire, the sectional height of said tire being less than its width, a plurality of circumferentially extending radially outwardly projecting ribs integral with said base inside the tire, said ribs radially of the tire having a height of not less than 15% or more than 30% of that portion of the sectional height of the tire lying radially outward of the base of the tire, the radial inner surface of the tire base having circumferentially spaced, transversely extending grooves formed therein, said wheel comprising a rigid tire rim disposed at the radial outer extremity of the wheel, said rim having a base portion and integral radially outwardly extending flanges which flanges terminate in axially extending shoulders which shoulders contact and support said tire sidewalls, said rim base having transversely extending ribs fitted into the said grooves in the inner surface of the tire.

References Cited in the file of this patent
UNITED STATES PATENTS

| | | |
|---|---|---|
| 781,262 | Xevers | Jan. 31, 1905 |
| 1,396,515 | McClevey | Nov. 8, 1921 |
| 2,021,500 | De Vita | Nov. 19, 1935 |
| 2,246,117 | Wallace | June 17, 1941 |
| 2,601,464 | Tanke | June 24, 1952 |
| 2,648,369 | Todd | Aug. 11, 1953 |